(12) United States Patent
Gorbatov et al.

(10) Patent No.: US 10,739,842 B2
(45) Date of Patent: Aug. 11, 2020

(54) POWER MANAGEMENT AND PROTECTION

(71) Applicant: Intel Corporation, Santa Clara, CA (US)

(72) Inventors: Eugene Gorbatov, Hillsboro, OR (US); Alexander B. Uan-Zo-Li, Hillsboro, OR (US); Muhammad Abozaed, Haifa (IL); Efraim Rotem, Haifa (IL); Tod F. Schiff, Portland, OR (US); James G. Hermerding, II, Vancouver, WA (US); Chee Lim Nge, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 15/477,046

(22) Filed: Apr. 1, 2017

(65) Prior Publication Data
US 2018/0284879 A1    Oct. 4, 2018

(51) Int. Cl.
| G06F 1/00 | (2006.01) |
| G06F 1/3296 | (2019.01) |
| G06F 15/76 | (2006.01) |
| G06F 1/30 | (2006.01) |
| G06F 1/3215 | (2019.01) |
| G06F 1/3287 | (2019.01) |
| G06F 15/78 | (2006.01) |

(52) U.S. Cl.
CPC .......... *G06F 1/3296* (2013.01); *G06F 1/305* (2013.01); *G06F 1/3215* (2013.01); *G06F 1/3287* (2013.01); *G06F 15/76* (2013.01); *G06F 15/7807* (2013.01)

(58) Field of Classification Search
CPC .. G06F 1/3296; G06F 15/7807; G06F 1/3215; G06F 1/3287
See application file for complete search history.

(56) References Cited

U.S. PATENT DOCUMENTS

| 5,859,481 A | 1/1999 | Banyas |
| 6,177,779 B1 | 1/2001 | Eguchi |
(Continued)

FOREIGN PATENT DOCUMENTS

| KR | 10-2013-0011811 A | 1/2013 |
| WO | 2017176358 A1 | 10/2017 |

OTHER PUBLICATIONS

Rotem et al., U.S. Appl. No. 15/093,042, filed Apr. 7, 2016, US Application, Drawings, and E-Ack Receipt attached 39 pages, not yet published.
(Continued)

*Primary Examiner* — Xuxing Chen
(74) *Attorney, Agent, or Firm* — International IP Law Group, P.L.L.C.

(57) ABSTRACT

In some examples, a peak power system includes a plurality of system components, one or more of the system components to dynamically provide a peak power requirement of the component. The system also includes a peak power manager to receive the peak power requirement of the one or more of the system components. The peak power manager can also dynamically provide, based on a system peak power limit and based on at least one updated peak power requirement received from at least one of the one or more system components, an updated component peak power limit to one or more of the system components.

30 Claims, 8 Drawing Sheets

(56) References Cited

U.S. PATENT DOCUMENTS

| | | | |
|---|---|---|---|
| 6,271,605 B1 | 8/2001 | Carkner et al. | |
| 8,756,442 B2 | 6/2014 | Naffziger et al. | |
| 9,395,774 B2 | 7/2016 | Rotem et al. | |
| 2003/0084358 A1 | 5/2003 | Bresniker et al. | |
| 2004/0117680 A1* | 6/2004 | Naffziger | G06F 1/3203 713/322 |
| 2004/0268166 A1 | 12/2004 | Farkas et al. | |
| 2008/0073975 A1 | 3/2008 | Wright et al. | |
| 2009/0001935 A1 | 1/2009 | Odaohhara | |
| 2009/0326724 A1 | 12/2009 | Lasseter et al. | |
| 2012/0139345 A1 | 6/2012 | Ye et al. | |
| 2012/0198249 A1 | 8/2012 | Benhase et al. | |
| 2013/0093505 A1 | 4/2013 | Gupta et al. | |
| 2013/0111410 A1 | 5/2013 | Okada et al. | |
| 2013/0124885 A1 | 5/2013 | Davis et al. | |
| 2013/0169038 A1 | 7/2013 | King | |
| 2014/0067139 A1* | 3/2014 | Berke | G06F 1/26 700/291 |
| 2014/0092106 A1 | 4/2014 | Hurd et al. | |
| 2014/0098525 A1 | 4/2014 | Bennett | |
| 2014/0181545 A1 | 6/2014 | Shrall et al. | |
| 2014/0181546 A1 | 6/2014 | Hallberg et al. | |
| 2014/0380072 A1 | 12/2014 | Lee | |
| 2015/0177811 A1 | 6/2015 | Bose et al. | |
| 2015/0180249 A1 | 6/2015 | Jeon et al. | |
| 2016/0065052 A1 | 3/2016 | Shinozaki et al. | |
| 2016/0091950 A1 | 3/2016 | Thompson et al. | |
| 2016/0179164 A1 | 6/2016 | Park et al. | |
| 2017/0031431 A1* | 2/2017 | Khatri | G06F 1/3296 |
| 2017/0293332 A1 | 10/2017 | Rotem et al. | |

OTHER PUBLICATIONS

PCT International Search Report, PCT Application No. PCT/US2018/020174, dated Aug. 20, 2018, 4 pages.

International Search Report for related PCT Application PCT/US2017/016732 dated May 17, 2017. 2 pages.

International Search Report for related PCT Application Serial No. PCT/US2019/020036 dated Jun. 13, 2019, 3 pages.

* cited by examiner

100

700

POWER MANAGEMENT AND PROTECTION

TECHNICAL FIELD

This disclosure relates generally to maximum power protection or peak power protection.

BACKGROUND

Many computing systems (for example, portable mobile systems or client systems) need to maintain a system voltage above a certain level (for example, above a $V_{min}$ level. For example, in some mobile systems a minimum system voltage power management integrated circuit (PMIC) $V_{min}$ can be 2.5 volts (2.5V). In some client systems a minimum system voltage regulator (VR) or PMIC voltage $V_{min}$ can be 5.6V, for example. Every computing system will have some resistance between system battery cells and system VR. This resistance and voltage droop can limit peak platform power, particularly in situations where the battery is not fully charged.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Some embodiments relate to maximum power protection or peak power protection.

Some embodiments relate to power management. Some embodiments relate to power generation. Some embodiments related to voltage generation. Some embodiments relate to power protection. Some embodiments relate to voltage protection.

As discussed above, many computing systems (for example, portable mobile systems or client systems) need to maintain a system voltage above a certain level (for example, above a $V_{min}$ level). Failure to maintain a system voltage above Vmin can result in a system shutdown. For example, in some mobile systems a minimum system voltage power management integrated circuit (PMIC) $V_{min}$ can be 2.5 volts (2.5V). In some client systems, a minimum system voltage regulator (VR) or PMIC voltage $V_{min}$ can be 5.6V, for example. Every computing system will have some resistance between system battery cells and system VR. This resistance and voltage droop can limit peak platform power, particularly in situations where the battery is not fully charged. The resistance results in large system voltage droops during large power or current draws. The resulting voltage droop below a minimum voltage (Vmin) can increase as voltage of the battery reduces due to a state of charge. Since risk to shutdown is not typically acceptable, the battery or adaptor sizes must be increased to accept a worst case expected current, and resulting voltage droop of the system creates a situation where peak power must be limited to allow for smaller batteries and adapters.

Figure 1:
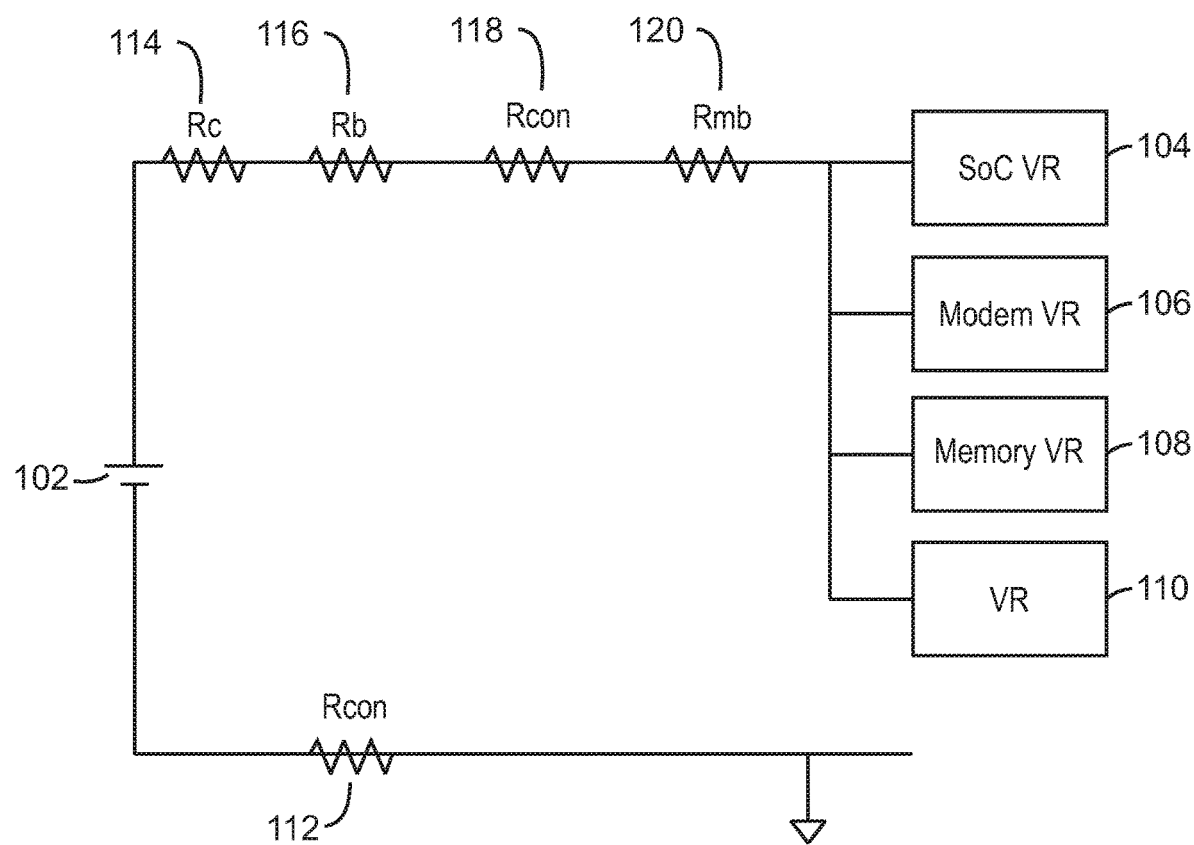
FIG. 1 illustrates a computing system example.

FIG. 1 illustrates a computing system example 100 showing exemplary resistance between one or more battery cells 102 and system voltage regulation (VR), such as, for example, a system on chip (SoC) voltage regulator 104, a modem voltage regulator 106, a memory voltage regulator 108, or one or more other system voltage regulator 110. The resistance between battery cell(s) and system voltage regulator(s) can include, for example, battery cell, battery connector and sense resistor(s), pass field effect transistor(s), or power delivery traces on the motherboard. Such example resistances are illustrated by $R_{con}$ 112 (battery connector resistance), $R_c$ 114 (resistance of a battery cell or resistance of an external power supply such as a brick, charger or power supply unit), $R_b$ 116 (battery enclosure resistance), $R_{con}$ 118 (connector resistance), or $R_{mb}$ 120 (motherboard resistance, such as, for example field effect transistors, power train, etc.), for example. An amount of such resistances can depend on factors including, for example, battery configuration (for example, a number of battery cells in series vs. a number of battery cells in parallel), the quality and design of components, wear, temperature, or load step, etc. In some mobile or client systems, an amount of system resistance can be in a range between 100 mOhm and 200 mOhm, for example. In some mobile or client systems, an amount of system resistance can be in a range between 50 mOhm and 185 mOhm, for example.

FIG. 1 can be viewed as a conceptual figure illustrating the concept that in a computing system, between the battery through the board to the system voltage regulators there is a certain amount of resistance, and there is a voltage drop across this resistance. In today's computing systems, there is a limit as to how much current or total system power may be consumed, and a concern that the minimum voltage of the system should not be violated. A resistance between one or more battery cells and one or more voltage regulator(s) in a computing system can create a voltage droop (I*R) that can limit peak platform power (particularly if the battery is not fully charged).

Figure 2:
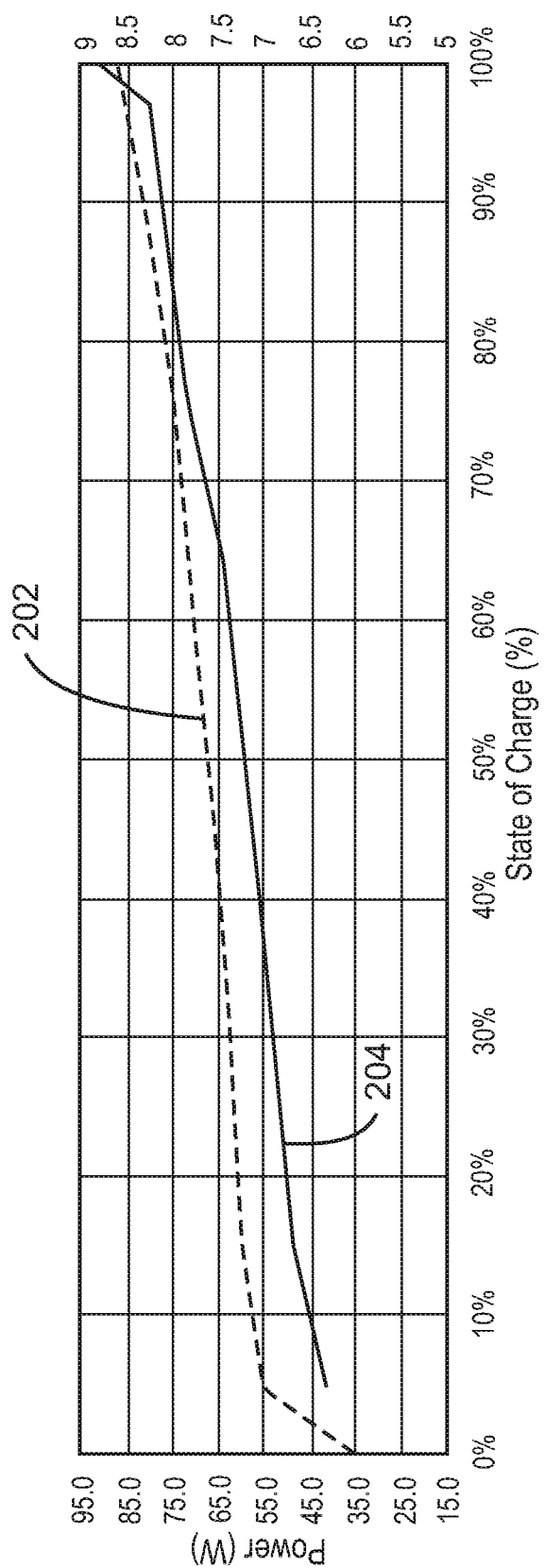
FIG. 2 illustrates a maximum system power and battery voltage diagram.

FIG. 2 illustrates a diagram 200 of maximum system power of an example computing system on the vertical axis vs. a state of battery charge on the horizontal axis. As illustrated in FIG. 2, battery voltage 202 decreases with a lower state of charge, limiting an amount of current that can be delivered by the battery without violating a system voltage regulator minimum system voltage ($V_{min}$) level. FIG. 2 also illustrates peak platform power 204 as a function of the state of charge of the battery.

Limiting peak power can significantly impact system performance. In a computing system, a platform peak power budget may need to be allocated among many different system components such as, for example, display(s), camera(s), modem and connectivity devices, memory, storage, SoC, etc. Each of the different system components in the computing system can have different maximum power ($P_{max}$) levels, and peak independently over very short time scales (for example, in a matter of microseconds). Even though in some examples it might be statistically unlikely that all system components will peak at the same time, particularly in realistic usage scenarios, in order to protect a system from violating voltage level requirements $V_{min}$, many systems are designed to take a conservative approach to power management by calculating $P_{max}$ as a sum of all system component worst case peak power situations. In some systems, the worst case PMax is reduced by a static scaling factor (for example 25%). This approach to managing platform maximum system power level $P_{max}$ doesn't account for component state (for example, whether a particular platform component is on or off) and can limit the power budget for the SoC, for example.

SoC peak power limits can significantly constrain operating frequency of the SoC. Since SoC power is highly dependent on system workload, SoC power can peak unpredictably and almost instantaneously. In order to make sure that SoC power never exceeds its $P_{max}$ budget, the operating frequency may need to be proactively controlled to ensure that a worst case power strike does not violate the $P_{max}$ limit.

The combination of lower SoC $P_{max}$ budget due to the worst case power assumption for platform components, and the need to limit SoC frequency in order to ensure that the power budget is not violated can significantly reduce system performance, particularly when the battery is not fully charged.

Figure 3:
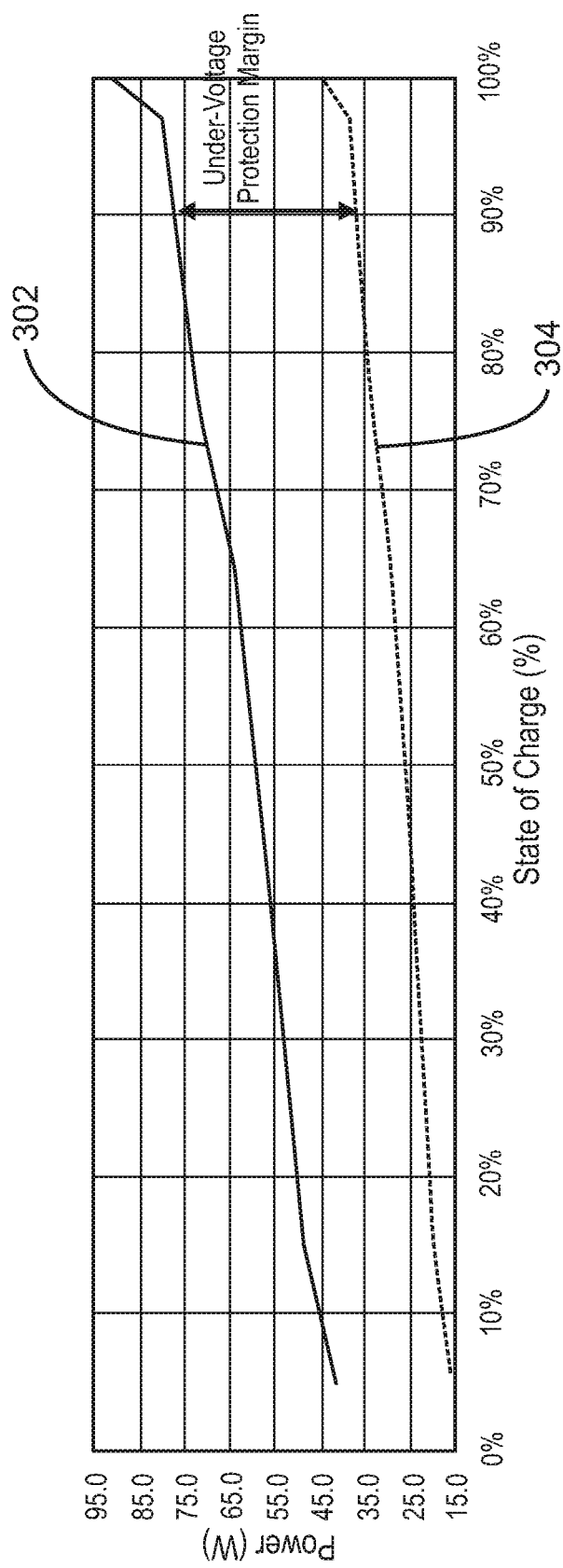
FIG. 3 illustrates a maximum system power diagram.

FIG. 3 illustrates a diagram 300 showing in some examples a power margin that needs to be maintained between a maximum power $P_{max}$ limit 302 and a platform power 304 in order to ensure under-voltage protection. The difference between the maximum power $P_{max}$ limit 302 and the platform power 304 is shown in FIG. 3 as an under-voltage protection margin. For example, if the battery is 50% charged, FIG. 3 illustrates the operating platform power budget 304 is approximately 25 Watts. This is compared with an approximately 55 Watt budget 302 that is available based on battery capability and system VR limits, for example.

In order to ensure protection of the system, the system can be limited as to how much power it can consume. The system can make sure that in the case of any possible worst case power spike, it does not exceed the maximum power available for the system. The dotted line 304 in FIG. 3 representing platform power shows an example of where a system may operate in some situations in order to make sure that the system power being used does not cross the solid line 302 in FIG. 3 which represents a maximum power limit. However, the area between the maximum power limit 302 and the platform power 304 represents an under-voltage power budget protection margin of power that is typically not consumed by the system in order to make sure that the power use does not ever exceed the maximum power limit solid line 302, even in a situation when various system devices have power spikes at the same time. So the under-voltage protection margin illustrated in FIG. 3 represents an amount of power that is not used, since the system is preparing for a situation where multiple system components experience voltage spikes at the same time. For example, in the example illustrated in FIG. 3, at a 50% state of battery charge, the system may be designed to operate the entire system at around 25 Watts. However, at that 50% state of battery charge, the battery may be capable of delivering around 55 Watts. The difference between the capability of the battery (55 Watts) and the power that the system is allowed to operate at (25 Watts) is the margin that is maintained by the system in case multiple components spike at the same time. Even if multiple components do spike at the same time, the system will be sure that the power capability of 55 Watts is never exceeded. However, the area between the dotted line 304 and the solid line 302 is an optimization opportunity. That is, according to some embodiments, as much as possible of the power optimization opportunity such as between lines 302 and 304 can be used by the system, and the additional use of power between lines 302 and 304 can be converted to performance of the system.

A lower power budget can impact systems differently under different workload situations. For example, in some systems, when a maximum power $P_{max}$ limit is applied, a turbo operating frequency can be reduced for all workload scenarios, with multi-threaded (MT) workloads showing significant performance degradation (for example, a 40% performance drop could occur with a 50% charged battery).

Some embodiments relate to managing under-voltage conditions and platform peak power. According to some embodiments, instead of assuming worst case peak power, platform components can dynamically communicate their peak power requirements. These requirements can be, for example, a function of user input, internal or external conditions, a component's state, or an overall system workload. For example, display brightness and a peak power of the display can be a function of user input, modem peak power can depend on external network conditions, and an audio subsystem peak power can depend on whether speakers are turned on or turned off. As peak power requirements of a component changes, these requirements can be provided to a platform peak power management agent (platform maximum power $P_{max}$ agent) that can adjust SoC peak power (maximum power $P_{max}$) limits.

In some embodiments, a platform can provide under-voltage protection that monitors system voltage and asserts a signal (for example, a voltage protection alert, a Prochot # signal, or a similar signal) whenever voltage droops below a particular threshold (for example, when voltage droops below a specified threshold level). The SoC can provide support for a voltage protection alert (for example, a Fast Prochot # Response) that can lower SoC power within a very short timeframe (for example, within a few microseconds), allowing platform caps to service the power spike. In some embodiments, a system can remove a maximum power $P_{max}$ margin or guard band, and operate close to a system battery capability. This can significantly increase performance (for example, can significantly increase a turbo performance).

In some embodiments, maximum power ($P_{max}$) management allows a system to dynamically determine component maximum power ($P_{max}$) requirements, and enables operation closer to battery capability level. This can remove $P_{max}$ power margins (for example, an under-voltage protection margin) and guard band (for example, by using a higher under-voltage protection threshold with a voltage protection alert, or SoC Fast Prochot #).

In some embodiments, under-voltage protection or minimum voltage management can be used to provide performance benefits across multiple workload scenarios and battery charge levels. For example, with reduced battery charge levels, performance of various computing system components (such as graphics performance, single thread performance, or multi-thread performance, for example) can be improved. In some embodiments applications, workloads, or usages, etc. can be used to deliver higher system performances (for example, applications, workloads, or usages, etc. that use a turbo mode).

Figure 4:
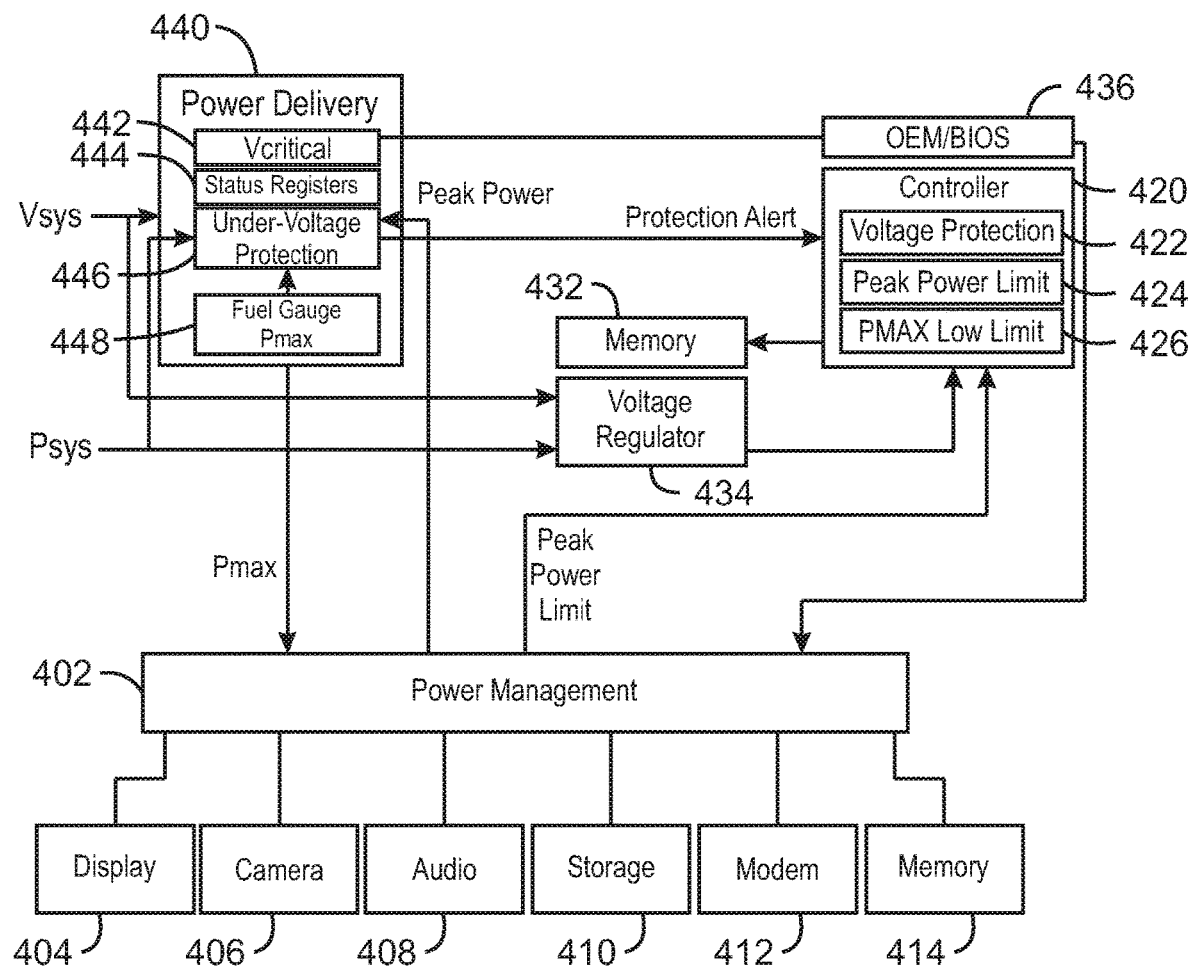
FIG. 4 illustrates a power management system.

FIG. 4 illustrates a power management system 400. Power management system can include power management 402 (for example, a power management agent or PMA, thermal management, a thermal and power management agent, a peak power manager, a peak power agent, a PMax Agent, a dynamic platform thermal framework or DPTF, etc.) In some embodiments, power management 402 is implemented in software, hardware, or firmware. In some embodiments, power management 402 is implemented in two or more of software, hardware, or firmware. For example, in some embodiments, power manager 402 can be distributed between software and hardware. In some embodiments, power management 402 is implemented in an operating system (OS). Power management system 400 also includes a number of system components such as, for example, display 404, camera 406, audio 408 (for example audio speakers), storage 410, modem 412 (for example, a connectivity modem such as WiFi, WiGig, cellular, LTE, 3G, or 4G, for example), or memory 414. It is noted that additional system components can be added in some embodiments, or in some embodiments, other system components can be included instead of one or more of the components illustrated in FIG. 4. System 400 also includes a controller 420 that includes voltage protection 422, peak power limit 424, and PMax low limit 426, for example. In some embodiments, controller 420 can be a system on a chip (SoC), a processor, a graphics processor, a controller on a graphics card or on some other type of card such as a field programmable gate array or FPGA, or some other controller, etc. Controller 420 can be any type of controllable element or controller element. System 400 additionally includes system components such as memory 432 and voltage regulator 434. In some embodiments, memory 432 can be memory dedicated to controller 420 (for example, such as dynamic random access memory or DRAM in some embodiments). In some embodiments, voltage regulator 434 can be a voltage regulator or a power supply dedicated to supply power to controller 420 or to other system components. System 400 also includes power delivery device 440, which can include a critical voltage register 442, status registers 444, under-voltage protection 446, and a fuel gauge PMax device 448. In some embodiments, power delivery device 440 can provide platform power delivery or system power delivery. In some embodiments, power delivery 440 can include a power management integrated circuit or PMIC, a charger, a discrete power delivery element, or any power delivery element.

In some embodiments, platform or system components such as example components 404, 406, 408, 410, 412, or 414 (or other components not illustrated in FIG. 4) can communicate their respective maximum power (or PMax) requirements to the power manager 402. The power manager 402 receives maximum power requests (PMax requests) from one or more system components (or from an overall system power delivery device such as power delivery 440), and re-adjusts peak power limits for other system or platform components. PMax fuel gauge device 448 can be a special platform device for providing PMax requests to the power manager 402, and can provide PMax for the entire computing platform or system. PMax fuel gauge 448 can monitor state of charge, temperature, and other parameters, and dynamically compute a new platform/system maximum power (PMax) based on battery voltage and resistance, and communicates it to the power manager 402.

In some embodiments, all or a portion of a power budget may be re-claimed (for example, using the system of FIG. 4). That is, in some embodiments all or a portion of the power budget represented by the under-voltage protection margin illustrated in FIG. 3 may be used (for example, using the system of FIG. 4). In some embodiments, platform components (for example, display, camera, audio, modem, connectivity such as WiFi, WiGig, cellular such as LTE, 3G, or 4G, storage, memory, or any other components in the system) can each communicate dynamically the peak power requirements of that component. For example, in FIG. 4, any of the display 404, camera 406, audio 408, storage 410, modem 412, or memory 414, etc. can communicate their peak power requirements to the power manager 402.

As discussed above, power manager 402 can be implemented anywhere. It can be implemented in hardware, firmware, software, or an operating system (OS), etc., for example. In some embodiments, power manager 402 can be a central control point that allows multiple components to communicate their dynamic peak power requirements. In this manner, peak power requirements of any of the components can change at any time and those peak power requirements can be dynamically communicated to the power manager 402. For example, peak power requirements of camera 406 might change depending on whether the camera is on or off, or if the flash is enabled. Similarly, peak power requirements of display 404 might change depending on the display brightness level setting (for example, if the brightness level of display 404 is high, the peak power requirement of display 404 can be relatively high, and if the brightness level of display 404 is low, the peak power requirement of display 404 can be relatively low). In the case of audio 408, for example, the peak power requirement may change depending on the volume level setting, or whether speakers are turned on or off, etc. In the case of storage 410, a user may specify an intended storage bandwidth (input/output or I/O bandwidth), which can also change a peak power requirement for storage 410. If I/O requests per second of storage 410 or memory 414 drops, peak power requirement for that component will drop, for example. Each of the system components such as components 404, 406, 408, 410, 412, and 414, for example, can compute their peak power requirement at any given time, and provide it to the power manager 402. The power manager 402 can decide how to allocate an overall system power budget based on peak power requirement information received from each of the components in the system. If the power manager 402 is implemented in software, communication between the power manager and the components can be implemented using a device driver, for example. In some embodiments communication with the power manger 402 may be implemented completely in the component device itself. For example, in the case of audio speakers, when the speakers turn on, the power manager 402 can receive an interrupt from the audio device itself indicating that the peak power requirement of the audio device has changed to a specified new level. In some embodiments, if the power manager 402 is implemented in hardware, the peak power requirement information can be communicated over a platform management bus or interface, for example.

Fuel Gauge PMax 448 can be any element of power delivery that can calculate an overall platform power value (such as an overall system power value, PMax, maximum power, or peak power, etc.) based on, for example, system peak power capabilities. System peak power capabilities can be based on, for example, a variety of physical characteristics such as battery state of charge, temperature, system resistance, etc. Fuel Gauge PMax 448 can calculate the overall platform power value and send it to the power manager 402. Fuel Gauge PMax 448 can dynamically re-calculate the overall platform power value and send an updated value (for example, updated PMax signal in FIG. 4) to the power manager 402 whenever the value changes.

Any time that any of the components in the system (for example, such as display 404, camera 406, audio 408, storage 410, modem 412, memory 414, or other components) updates its peak power requirements, the power manager 402 re-computes the overall peak power budget for all of the system components. Once the peak power budget for the system components are computed, the remainder of the overall power budget can be assigned to one or more controllers in the system such as controller 420. This assignment of power budget to controller 420 is illustrated in FIG. 4 as the peak power limit signal from power manger 402 to controller 420 (for example, this peak power limit is the peak power limit of the controller 420). The peak power limit provided from the power manager 402 to the controller 420 is stored in the peak power limit register 424. The controller 420 makes sure that whatever happens in controller 420, that the controller 420 will not cross this peak power limit stored in register 424.

For example, if a brightness of the display 404 is 200 nits, and display 404 is consuming a peak power budget of 2.5 Watts, when the user wants to increase the brightness of display 404 to 400 nits, the peak power of display 404 needed to do so may be 5 Watts. Before the user is allowed to increase the brightness accordingly, the display 404 can let the power manager 402 know that it is requesting an increase in peak power budget for display 404. This can be implemented, for example, by a display driver of display 404. Power manager 402 receives the request from the display 404 to increase the peak power for display 404 from 2.5 Watts to 5 Watts, and re-computes peak power available for other components in view of this change. Power manager 402 then may decide to lower the peak power limit provided to the controller 420 to lower the peak power limit of the controller 420 (or one or more controllers) by 2.5 Watts. Alternatively, power manager 402 may decide to inform another component (for example, storage 410) that it the peak power limit of storage 410 is 2.5 Watts less. In some embodiments, power manager may decide to inform a combination of components that they will have less peak power (for example, by informing audio 408 that it will have 1 Watt less peak power and informing camera 406 that it will have 1.5 Watts less peak power). In some embodiments, power manager 402 might distribute the decrease of 2.5 Watts peak power among controller 420 and one or more of the components, etc. For example, the power manager 402 can inform the controller 420 that it needs to drop peak power by 1.5 Watts, inform storage 410 that it needs to drop peak power by 0.5 Watts and inform audio 408 that it needs to drop peak power by 0.5 Watts. The decrease of peak power for some components and increase of peak power for other components can be implemented based on a peak power policy within power manager 402 (or accessible by power manager 402).

If a component reduces its peak power for some reason (for example, a user turns a speaker off and audio 408 needs less peak power), that component notifies the power manager 402 and the power manager 402 determines components or controllers, or a combination thereof, that will receive an increase in peak power budget, and notifies those components or controllers of their increase in peak power budget and notifies the component that needs less peak power of its decrease in peak power budget. If a component needs to increase its peak power for some reason (for example, a user turns on camera 406 and the camera 406 needs more peak power), that component notifies the power manager 402 and the power manager 402 determines components or controllers, or a combination thereof, that will receive a decrease in peak power budget, and notifies those components or controllers of their decrease in peak power budget, and notifies the requesting component of its increase in peak power budget.

In some embodiments, the system (or platform) can consume more power than the battery can provide for a very short period of time, for example, due to inherent capacitance of the system. For example, even though a system may have a peak power capacity at a particular time, battery state of charge, etc. of 55 Watts, for example, the system may be able to consume 70 Watts or 80 Watts for a very short period of time. In some embodiments, the system detects very quickly a situation where an amount of power higher than the peak power capacity is being consumed. For example, peak power limits of individual system components can be throttled back so that the system quickly consumes less than the limit (for example, the 55 Watt system peak power limit). This can be implemented, for example, using Vcritical threshold register 442, which can be initially set by an original equipment manufacturer (OEM) 436 or the Basic Input/Output System (BIOS) 436. In some embodiments, the Vcritical threshold register 442 can be constantly updated by the power manager 402 based on platform characteristics (for example, based on PMax, peak power budgets, or current spikes that can be accommodated by various system components, etc.) Power delivery device 440 also monitors the system voltage Vsys, and when the system voltage crosses a certain level relative to the stored Vcritical threshold 442 (for example, when Vsys drops below the Vcritical threshhold 442), the under-voltage protection device 446 generates a protection alert signal (for example, a voltage protection alert or power protection alert) to the controller 420. Although not illustrated in FIG. 4, the protection alert signal can also be provided to other system components (for example, to storage 410, another controller such as a discrete graphics card, etc.) In some embodiments, the peak power signal provided from the power manager 402 to the under-voltage protection 446 is a control signal indication from the power manager 402 to the under-voltage protection 446 telling the under-voltage protection 446 what threshold to use. In some embodiments, under-voltage protection 446 provides the protection alert signal to multiple system components when the system voltage Vsys crosses a threshold such as the Vcritical threshold 442. The protection alert signal can tell controller 420 as well as other system components to lower peak power consumption to a lowest level. For example, in the case of controller 420, the protection alert signal sent from under-voltage protection 446 to controller 420 is an indication to controller 420 to lower its peak power consumption to the PMax low limit value stored in register 426. In some embodiments, the protection alert signal can be sent to controller 420 using an existing pin of that controller (such as an existing pin of the controller), or implement a new signal interface of the controller 420 (for example, a peak power alert signal). Status register 444 can be used to store a number of alerts that have occurred (for example, how many times a protection alert signal has been issued by the power delivery device 440).

In some embodiments, when the power manager 402 determines the peak power for various components, and determines what value to set the Vcritical threshold 442, the power manager can make an assumption of the level to which the platform power components will each drop their power values when the protection alert signal is generated.

In some embodiments, the power manager 402 knows peak power of system components, how low the peak power will drop if a protection alert is generated, and the resistance of the system, and is able to calculate what the Vcritical threshold 442 should be based on one or more of these factors. The threshold value is communicated by the power manager 402 to the under-voltage protection 446 control so that the threshold can be set and monitored by the under-voltage protection 446 and trigger the protection signal when the voltage threshold is crossed.

In some embodiments, system components (for example, one or more of the system components illustrated in FIG. 4) can provide maximum peak power (or PMax requirements). In some embodiments, for some or all system components (for example, one or more system components illustrated in FIG. 4), the component can request state transitions with or without requesting their peak power requirement. For example, in some embodiments, one or more (or all) components can request state transitions only (for example, in a case of an audio device, the audio device can request a speaker on state or a speaker off state). In some embodiments, the peak power requirement can come from the device itself (for example, from a register in an audio device or other device). In some embodiments, a peak power requirement for a device can be computed by a power manager (for example, by power manager 402 in response to a state transition signal from the system component). In some embodiments, the power manager or a system component can delay a transition of the system component from one state to another until peak power allocation has been adjusted. In some embodiments, a controller (for example, controller 420) or another system component (for example, one of the system components of FIG. 4) can lower their peak power to a specific level after receiving an alert signal such as the protection alert signal of FIG. 4.

Figure 5:
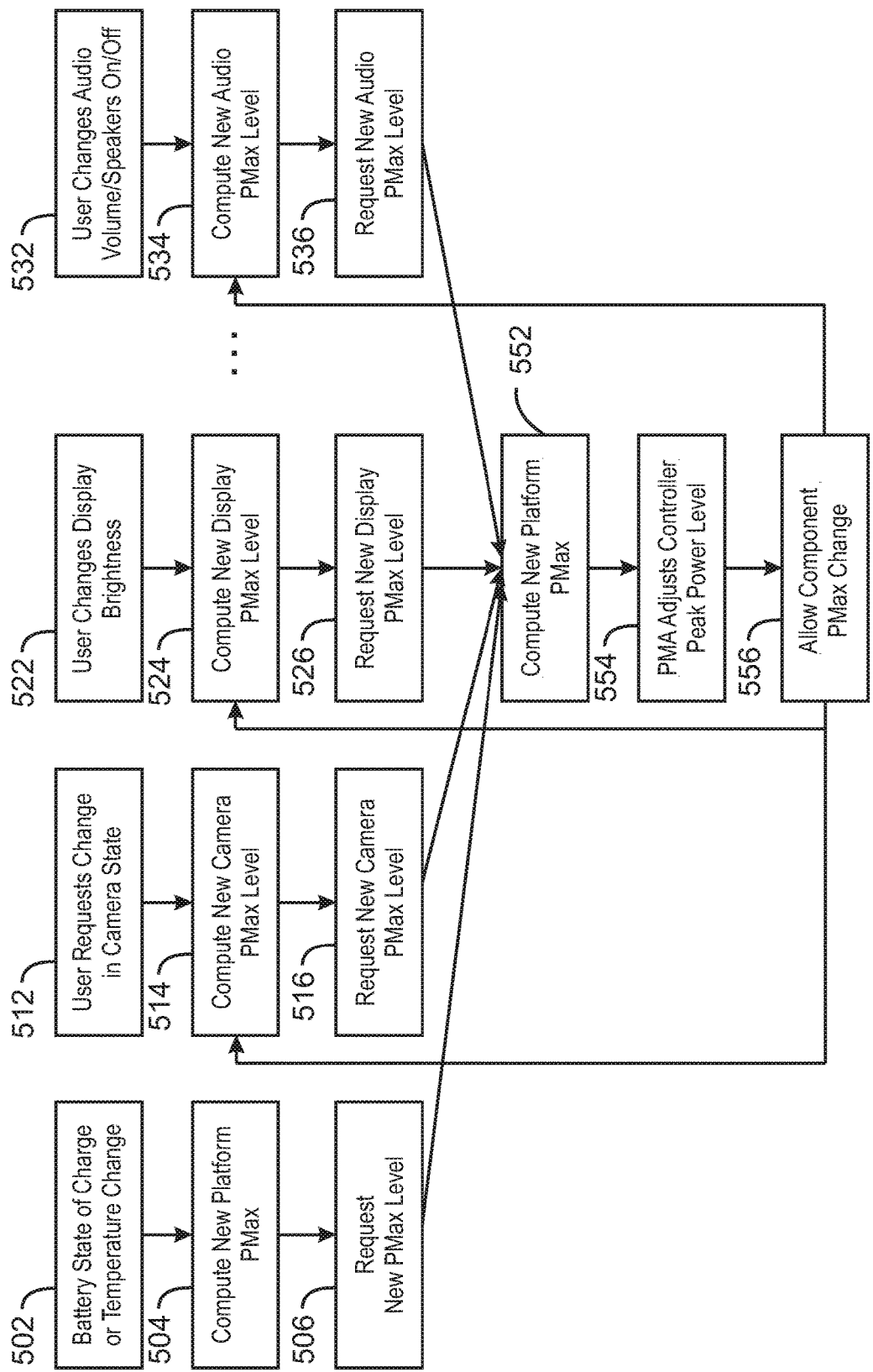
FIG. 5 illustrates power management.

FIG. 5 is a flow chart 500 illustrating power management flow. In some embodiments, the power management flow 500 illustrated in FIG. 5 can be implemented, for example, by power manager 402. In some embodiments, power management flow 500 can be implemented in software. In some embodiments, power management flow 500 supports maximum power (PMax) flow for slower system/platform components that can tolerate software latency (for example, software latency of a few hundred milliseconds) before their PMax requests are granted. As illustrated in FIG. 5, these components may include camera components, display components, and audio components, but can include different components in addition to or instead of one or more of these components. In some embodiments, FIG. 5 represents a more detailed flow chart of component power, and how some system components (for example, some system components illustrated in FIG. 4) can communicate with a power manager to implement various embodiments. It is noted that the flow chart of FIG. 5 includes flow relating to components such as a camera, a display, and an audio device, but some embodiments can relate to different system components, or can include additional system components, for example. As described above, according to some embodiments, one or more system components can compute (for example, on an ongoing basis, dynamically, or constantly) a worst case scenario peak power given, for example, the state and configuration of that component, and provide it to a peak power manager (such as power manger 402) so that the peak power manager knows the peak power (for example, PMax or maximum power) of each component (for example, dynamically).

At box 502, the computing system platform can monitor or identify a battery state of charge or a temperature change. Then, at 504 a new platform maximum power (PMax) can be computed (for example, using a fuel gauge such as fuel gauge 448). At 506 a request for a new Pmax level (for example, as requested by a fuel gauge such as fuel gauge 448) can be received (for example, by a power manager such as power manager 402).

At box 512, a user can request a change in a state (for example, an ON/OFF state) of a camera (for example, such as camera 406). This may be requested, for example, using a user interface (for example, an operating system user interface). At 514, a new camera maximum power (PMax) is computed (for example, using a camera driver or a system power management driver, or provided directly by the device). At 516, a new camera PMax level request is received (for example, received by a power manager such as power manager 402 from a camera driver of a camera such as camera 406).

At box 522, a user can request a change in a state (for example, a brightness level) of a display (for example, such as display 404). This may be requested, for example, using a user interface (for example, an operating system user interface). At 524, a new display maximum power (PMax) is computed (for example, using a display driver, or a system power management driver, or provided directly by the device). At 526, a new display PMax level request is received (for example, received by a power manager such as power manager 402 from a display driver of a display such as display 404).

At box 532, a user can request a change in a state (for example, an ON/OFF state or a change in audio volume or speaking volume) of an audio device (for example, such as audio device 408). This may be requested, for example, using a user interface (for example, an operating system user interface). At 534, a new audio maximum power (PMax) is computed (for example, using an audio driver, or a system power management driver, or provided directly by the device). At 516, a new camera PMax level request is received (for example, received by a power manager such as power manager 402 from a driver of an audio device such as audio device 408).

At box 552, a new platform PMax is computed (for example, by a power manager such as power manager 402). In some embodiments, the new platform PMax value can be computed in response to battery conditions (for example, via boxes 502, 504, 506), and in some embodiments, the new platform PMax value can be computed in response to changes in one or more platform components. At box 554, a controller adjusts a peak power level of the controller (for example, a controller in the computing system such as controller 420, an SoC, or a processor, for example). At box 556, a power manager such as power manager 402 allows a component PMax change (for example, a platform or system component such as a display, a camera, an audio device, a storage device, a modem, a memory, etc.)

In some embodiments, when a user changes a display brightness, for example, power management 500 can compute new display PMax requirements and send a request to a power manager (such as power manager 402, for example) with its new PMax value. For example, in some embodiments, when a user changes a display brightness, a power manager such as power manager 402 or power management 500, for example) computes a new PMax value. If the request is for a lower peak power (for example, lower brightness of the display), the power manager acknowledges the request and uses available power budget to increase peak power (and therefore performance) of other platform components (for example, a controller such as an SoC or processor). If the request is for higher peak power level (for example, higher display brightness), the power manager first lowers the PMax level of other components (for example, of a controller such as an SoC or processor) in order to free up a PMax power budget needed by the display in order to increase the brightness, and sends an acknowledgement to the display driver, for example.

Additionally, any other platform or system components can go through a similar flow with the power manager. For example, when the user turns a camera on or off, or adjusts a speaker volume, corresponding drivers can compute new PMax requests, send them to the power manager, and wait for acknowledgment before allowing the user action to be completed.

In some embodiments, the power manager can be implemented in hardware. For example, this can be implemented for platform components that cannot tolerate software latencies before they are allowed to change their state and corresponding PMax level. For example, in some embodiments, a cellular modem can tolerate up to 10 ms latency before it has to change transmit power or throughput after receiving a request from the network. For such devices, a power manager may need to be implemented in hardware. In some embodiments, a power manager implemented in hardware may be included in a system controller (for example, controller 420 or an SoC or a processor). In some embodiments, a power manager implemented in hardware may be included in a power delivery device (for example, power delivery device 440). In some embodiments, a power manager implemented in hardware may be implemented in a separate device (for example, such as power manager 402). In some embodiments, in a hardware implementation, platform components can communicate with a hardware power manager over a platform interface (for example, such as I2C) or an Input/Output (I/O) interface (for example, such as PCIe, PCI Express, or Peripheral Component Interconnect Express), and can also otherwise go through flow similar to that illustrated in FIG. 5.

Figure 6:
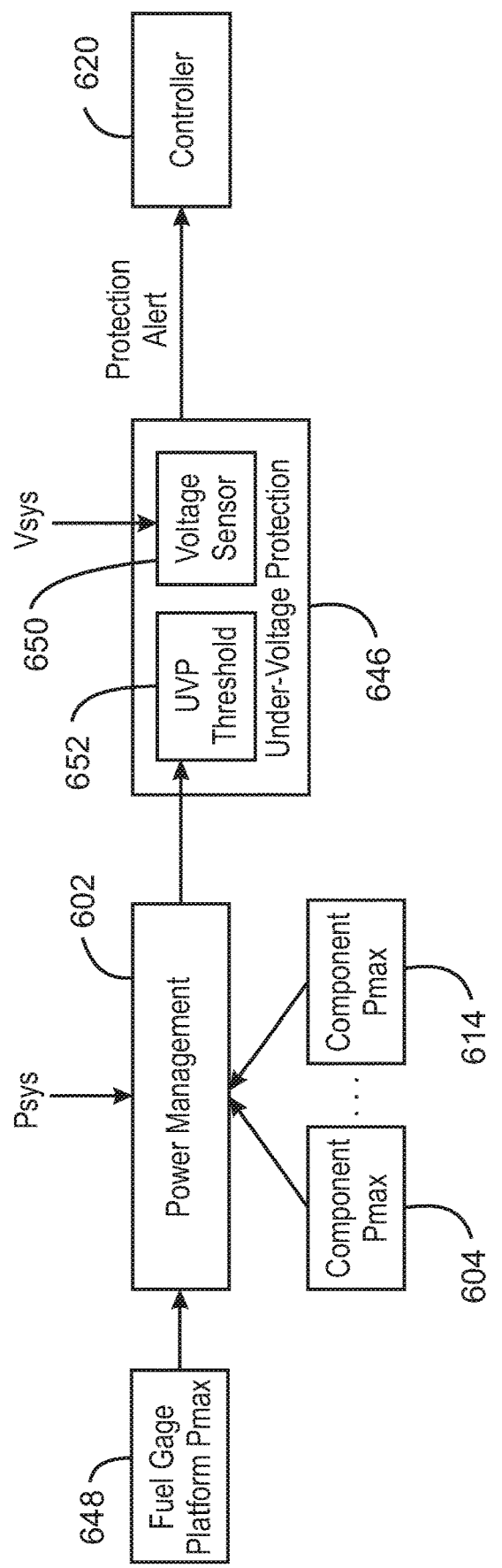
FIG. 6 illustrates a voltage protection system.

FIG. 6 illustrates a voltage protection system 600 (for example, an under-voltage protection system). FIG. 6 illustrates how under-voltage protection can be implemented according to some embodiments. In some embodiments, voltage protection 600 monitors system voltage (Vsys) and asserts a protection alert (for example, a voltage protection signal, a PROCHOT #, or other signal) if voltage droops below a particular threshold level.

In some embodiments, voltage protection system 600 includes a power manager (or power management agent, PMA, etc.) 602 (for example, similar to or the same as the power manager 402 of FIG. 4) and a number of system components 604, . . . , 614 (for example, similar to or the same as the system components illustrated in FIG. 4). System 600 also includes a controller (such as an SoC, processor, or other controller in a system) 620, an under-voltage protection device 646 having a voltage sensor 650 and an under-voltage protection (UVP) threshold 652. The system 600 also includes a fuel gauge platform PMax device 648.

In some embodiments, the power manager 602 updates (for example, constantly updates) voltage threshold based on a current platform PMax, battery voltage, and real time platform power consumption measurements (Psys). Under-voltage protection can sense voltage Vsys using voltage sensor 650, and generate a protection alert when an under-voltage protection threshold 652 is crossed. The controller 620 can provide support for a protection alert response (for example, a voltage protection, PROCHOT # or Fast PROCHOT # signal) that lowers controller power very quickly (for example, within a few microseconds), and allows platform power caps to service any power spikes. In some embodiments, system 600 is able to remove PMax margin (or guard band), and can operate close to system battery capability. This can significantly increase performance (for example, can significantly increase turbo performance).

In some embodiments, a power manager such as power manager 602 knows the power Psys that the system is consuming, peak power levels requested by the system components 604, . . . , 614, and the overall platform peak power (for example, from the Fuel Gauge 648). Based on those inputs, the power manager 602 computes an under-voltage threshold and sets that threshold in the UVP threshold storage device 652. The threshold voltage stored in UVP threshold 652 gets triggered when the actual system voltage Vsys, sensed by voltage sensor 650, crosses that threshold 652, and the under-voltage protection device 646 issues a protection alert signal. This protection alert signal is provided to controller 620. It is noted that the protection alert signal can be provided to one or more other system components in addition to the controller 620 (or instead of the controller 620).

Figure 7:
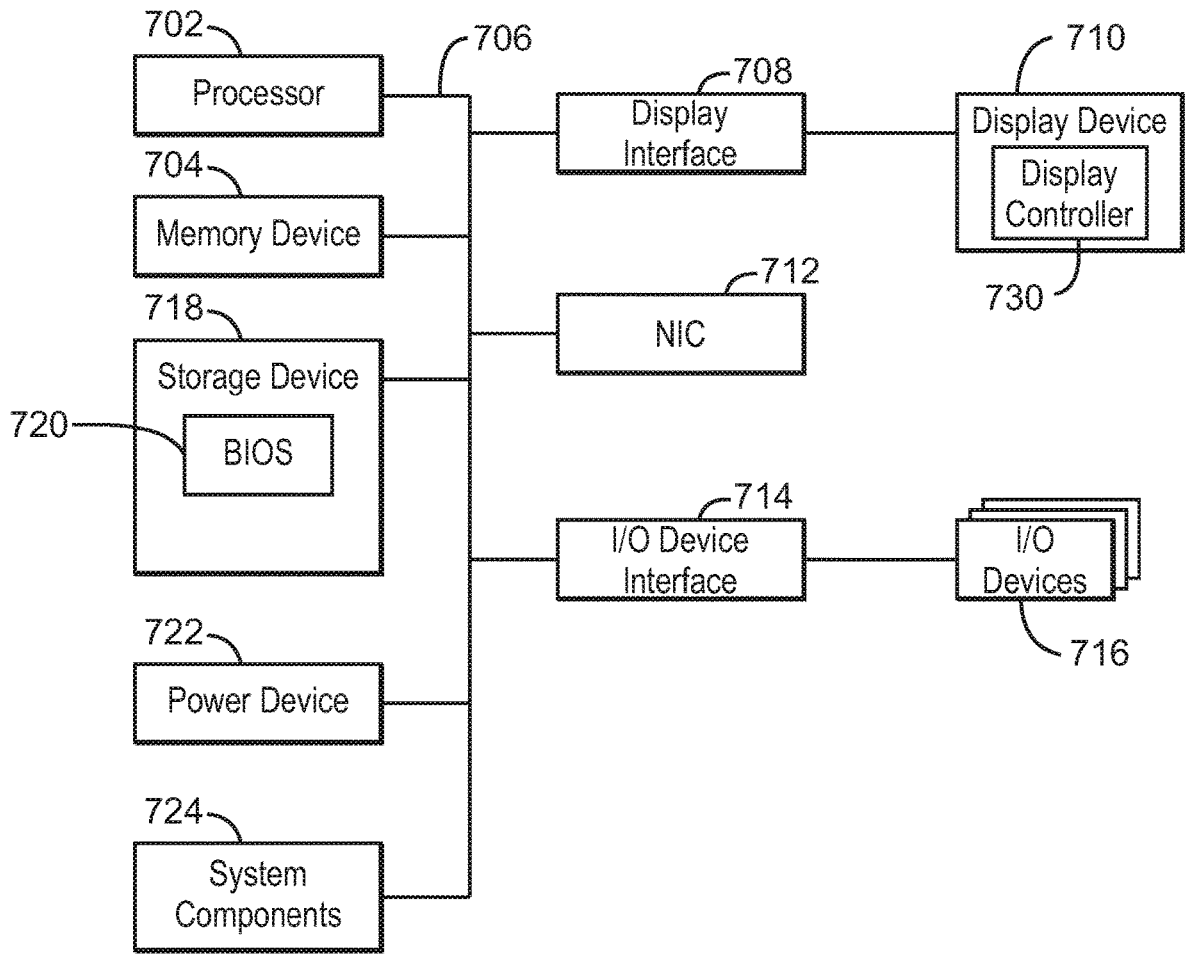
FIG. 7 illustrates a computing system.

FIG. 7 is a block diagram of an example of a computing device 700 that can include, for example, power management, peak power management, under-voltage protection, power generation, voltage generation, power protection, voltage protection, etc., according to some embodiments. In some embodiments, any portion of the circuits or systems illustrated in any one or more of the figures, and any of the embodiments described herein can be included in or be implemented by computing device 700. The computing device 700 may be, for example, a computing device, a portable device, a wearable device, an internet of things (IoT) device, a mobile phone, mobile device, handset, laptop computer, desktop computer, or tablet computer, among others. The computing device 700 may include a processor 702 that is adapted to execute stored instructions, as well as a memory device 704 (or storage device 704) that stores instructions that are executable by the processor 702. The processor 702 can be a single core processor, a multi-core processor, a computing cluster, or any number of other configurations. For example, processor 702 can be an Intel® processor such as an Intel® Celeron, Pentium, Core, Core i3, Core i5, or Core i7 processor. In some embodiments, processor 702 can be an Intel® x86 based processor. In some embodiments, processor 702 can be an ARM based processor. The memory device 704 can be a memory device or a storage device, and can include volatile storage, non-volatile storage, random access memory, read only memory, flash memory, or any other suitable memory or storage systems. The instructions that are executed by the processor 702 may also be used to implement power management, peak power management, under-voltage protection, power generation, voltage generation, power protection, or voltage protection, etc. as described in this specification. In some embodiments, processor 702 may include the same or similar features or functionality as, for example, various controllers in this disclosure (for example controller 420 or controller 620).

The processor 702 may also be linked through the system interconnect 706 (e.g., PCI®, PCI-Express®, NuBus, etc.) to a display interface 708 adapted to connect the computing device 700 to a display device 710. The display device 710 may include a display controller 730. Display device 710 may also include a display screen that is a built-in component of the computing device 700. The display device may also include a computer monitor, television, or projector, among others, that is externally connected to the computing device 700. In some embodiments, computing device 700 does not include a display interface or a display device.

In some embodiments, the display interface 708 can include any suitable graphics processing unit, transmitter, port, physical interconnect, and the like. In some examples, the display interface 708 can implement any suitable protocol for transmitting data to the display device 710. For example, the display interface 708 can transmit data using a high-definition multimedia interface (HDMI) protocol, a DisplayPort protocol, or some other protocol or communication link, and the like.

In addition, a network interface controller (also referred to herein as a NIC) 712 may be adapted to connect the computing device 700 through the system interconnect 706 to a network (not depicted). The network (not depicted) may be a cellular network, a radio network, a wide area network (WAN), a local area network (LAN), or the Internet, among others.

The processor 702 may be connected through system interconnect 706 to an input/output (I/O) device interface 714 adapted to connect the computing host device 700 to one or more I/O devices 716. The I/O devices 716 may include, for example, a keyboard or a pointing device, where the pointing device may include a touchpad or a touchscreen, among others. The I/O devices 716 may be built-in components of the computing device 700, or may be devices that are externally connected to the computing device 700.

In some embodiments, the processor 702 may also be linked through the system interconnect 706 to a storage device 718 that can include a hard drive, a solid-state drive (SSD), a magnetic drive, an optical drive, a USB flash drive, an array of drives, or any other type of storage, including combinations thereof. In some embodiments, the storage device 718 can include any suitable applications. In some embodiments, the storage device 718 can include a basic input/output system (BIOS) 720.

In some embodiments, a power device 722 is provided. For example, in some embodiments, power device 722 can provide charging, power, power supply, power delivery, power management, peak power management, under-voltage protection, power control, voltage regulation, power generation, voltage generation, power protection, or voltage protection, etc. In some embodiments, power 722 can be a part of system 700, and in some embodiments, power 722 can be external to the rest of system 700. In some embodiments, power 722 can provide any of charging, power, power supply, power delivery, power management, peak power management, under-voltage protection, power control, voltage regulation, power generation, voltage generation, power protection, or voltage protection, or related techniques described herein. For example, in some embodiments, power 722 can provide power management, peak power management, under-voltage protection, power generation, voltage generation, power protection, or voltage protection, etc. as described in reference to or illustrated in any of the drawings herein. In some embodiments, for example, power 722 includes one or more elements of FIG. 1, FIG. 2, FIG. 3, FIG. 4, FIG. 5, or FIG. 6.

FIG. 7 also illustrates system components 724. In some embodiments, system components 724 can include any of display, camera, audio, storage, modem, or memory components, or any additional system components. In some embodiments, system components 724 can include any system components for which power, voltage, power management, etc. can be implemented according to some embodiments as described herein.

It is to be understood that the block diagram of FIG. 7 is not intended to indicate that the computing device 700 is to include all of the components shown in FIG. 7 in all embodiments. Rather, the computing device 700 can include fewer or additional components not illustrated in FIG. 7 (e.g., additional memory components, embedded controllers, additional modules, additional network interfaces, etc.). Furthermore, any of the functionalities of power device 722 may be partially, or entirely, implemented in hardware or in a processor such as processor 702. For example, the functionality may be implemented with an application specific integrated circuit, logic implemented in an embedded controller, or in logic implemented in the processor 702, among others. In some embodiments, the functionalities of power device 722 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 722 can be implemented with an integrated circuit.

Figure 8:
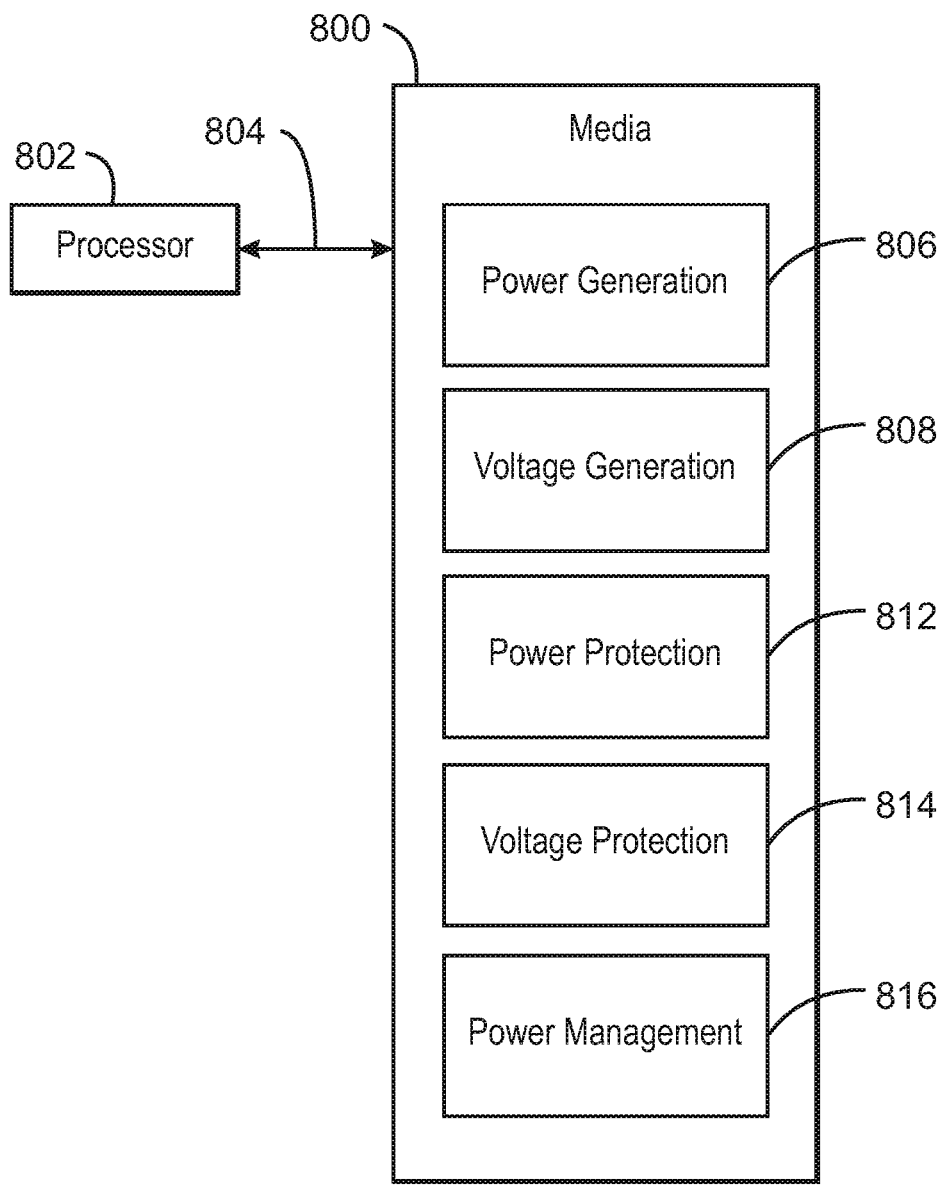
FIG. 8 illustrates one or more processors and one or more media.

FIG. 8 is a block diagram of an example of one or more processors 802 and one or more tangible, non-transitory computer readable media 800 for power management, peak power management, under-voltage protection, power generation, voltage generation, power protection, or voltage protection, etc. The one or more tangible, non-transitory, computer-readable media 800 may be accessed by the processor(s) 802 over a computer interconnect 804. Furthermore, the one or more tangible, non-transitory, computer-readable media 800 may include code to direct the processor(s) 802 to perform operations as described herein. In some embodiments, processor 802 is one or more processors. In some embodiments, processor(s) 802 can perform some or all of the same or similar functions that can be performed by other elements described herein using instructions (code) included on media 800 (for example, some or all of the functions illustrated in or described in reference to any of FIG. 1, FIG. 2, FIG. 3, FIG. 4, FIG. 5, FIG. 6, or FIG. 7). In some embodiments, one or more of processor(s) 802 may include the same or similar features or functionality as, for example, various controllers in this disclosure (for example controller 420, controller 620, or processor 702).

Various components discussed in this specification may be implemented using software components. These software components may be stored on the one or more tangible, non-transitory, computer-readable media 800, as indicated in FIG. 8. For example, power management, peak power management, under-voltage protection, power generation, voltage generation, power protection, or voltage protection, etc. may be adapted to direct the processor(s) 802 to perform one or more of any of the operations described in this specification and/or in reference to the drawings. For example, in some embodiments, one or more media 800 include(s) one or more of power generation 806, voltage generation 808, power protection 812, voltage protection 814 (for example, under-voltage protection), or power management 816 components.

It is to be understood that any suitable number of software components may be included within the one or more tangible, non-transitory computer-readable media 800. Furthermore, any number of additional software components shown or not shown in FIG. 8 may be included within the one or more tangible, non-transitory, computer-readable media 800, depending on the specific application.

This specification refers to a system and a platform. For example, in some places, this specification refers to platform power and in some places this specification refers to system power. It is noted that where system is included it is also contemplated that platform could be included in the same manner. It is also noted that were platform is included it is also contemplated that system could be included in the same manner. For example, if system power (or system voltage) is mentioned, that reference can also apply to platform power (or platform voltage). Similarly, if platform power (or platform voltage) is mentioned, that reference can also apply to system power (or system voltage).

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1

In some examples, a peak power system includes a plurality of system components, one or more of the system components to dynamically provide a peak power requirement of the component. The peak power system also includes a peak power manager to receive the peak power requirement of the one or more system components, and to dynamically provide, based on a system peak power limit and based on at least one updated peak power requirement received from at least one of the one or more system components, an updated component peak power limit to one or more of the system components. The peak power system can include under-voltage protection to monitor a system voltage and to provide an alert signal if the system voltage drops below a threshold value. The peak power system can also have one or more of the system components to lower peak power consumption of that component in response to the alert signal. The power manager can provide the threshold value to the under-voltage protection. The peak power system can include a controller, where the peak power manager is to dynamically provide an updated controller peak power limit to the controller based on the system peak power limit and based on the at least one updated peak power requirement received from the at least one of the one or more system components. The controller can be one or more of a processor, an SoC, a graphics processor, or a controller on an external card. The peak power system can include under-voltage protection to monitor a system voltage and to provide an alert signal if the system voltage drops below a threshold value, the controller to lower controller peak power consumption in response to the alert signal and/or one or more of the system components to lower peak power consumption of that component in response to the alert signal. The plurality of system components can include one or more of a display, a camera, an audio device, storage, memory, a modem, a communications device, an LTE communications device, a WiFi modem, a WiGig modem, a 2G communications device, a 3G communications device, or a 4G communications device.

Example 2

In some examples, a peak power method includes dynamically receiving a peak power requirement of one or more of a plurality of system components, and dynamically providing, based on a system peak power limit and based on at least one updated peak power requirement received from at least one of the one or more system components, an updated component peak power limit to one or more of the system components. The peak power method can include monitoring a system voltage and providing an alert signal if the system voltage drops below a threshold value. The peak power method can include lowering peak power consumption of one or more of the system components in response to the alert signal. The peak power method can include updating the threshold value. The peak power method can include dynamically providing an updated controller peak power limit to a controller based on the system peak power limit and based on the at least one updated peak power requirement received from the at least one of the one or more system components. The controller can be one or more of a processor, an SoC, a graphics processor, or a controller on an external card. The peak power method can include monitoring a system voltage, providing an alert signal if the system voltage drops below a threshold value, and lowering peak power consumption of the controller in response to the alert signal, and/or lowering peak power consumption of one or more of the system components in response to the alert signal. The plurality of system components can include one or more of a display, a camera, an audio device, storage, memory, a modem, a communications device, an LTE communications device, a WiFi modem, a WiGig modem, a 2G communications device, a 3G communications device, or a 4G communications device.

Example 3

In some examples, one or more tangible, non-transitory machine readable media includes a plurality of instructions that, in response to being executed on at least one processor, cause the at least one processor to dynamically receive a peak power requirement of one or more of a plurality of system components, and dynamically provide, based on a system peak power limit and based on at least one updated peak power requirement received from at least one of the one or more system components, an updated component peak power limit to one or more of the system components. The one or more tangible, non-transitory machine readable media can include a plurality of instructions that, in response to being executed on at least one processor, cause the at least one processor to monitor a system voltage and provide an alert signal if the system voltage drops below a threshold value. The or more tangible, non-transitory machine readable media can include a plurality of instructions that, in response to being executed on at least one processor, cause the at least one processor to lower peak power consumption of one or more of the system components in response to the alert signal. The one or more tangible, non-transitory machine readable media can include a plurality of instructions that, in response to being executed on at least one processor, cause the at least one processor to update the threshold value. The or more tangible, non-transitory machine readable media can include a plurality of instructions that, in response to being executed on at least one processor, cause the at least one processor to dynamically provide an updated controller peak power limit to a controller based on the system peak power limit and based on the at least one updated peak power requirement received from the at least one of the one or more system components. The controller can be one or more of a processor, an SoC, a graphics processor, or a controller on an external card. The or more tangible, non-transitory machine readable media can include a plurality of instructions that, in response to being executed on at least one processor, cause the at least one processor to monitor a system voltage, provide an alert signal if the system voltage drops below a threshold value, and lower peak power consumption of the controller in response to the alert signal, and/or lower peak power consumption of one or more of the system components in response to the alert signal. The plurality of system components can include one or more of a display, a camera, an audio device, storage, memory, a modem, a communications device, an LTE communications device, a WiFi modem, a WiGig modem, a 2G communications device, a 3G communications device, or a 4G communications device.

Example 4

In some examples, a peak power system includes a plurality of system components, one or more of the system components including means for dynamically providing a peak power requirement of the component, and means for managing peak power, the means for managing peak power to receive the peak power requirement of the one or more system components, and to dynamically provide, based on a system peak power limit and based on at least one updated peak power requirement received from at least one of the one or more system components, an updated component peak power limit to one or more of the system components. The system can include means for protecting under-voltage, means for monitoring a system voltage, and means for providing an alert signal if the system voltage drops below a threshold value. The system can include in one or more of the system components means for lowering peak power consumption of that component in response to the alert signal. The system can include means for providing the threshold value to the means for protecting under-voltage. The system can include means for controlling, and means for dynamically providing an updated controller peak power limit to the means for controlling based on the system peak power limit and based on the at least one updated peak power requirement received from the at least one of the one or more system components. The means for controlling can be one or more of a processor, an SoC, a graphics processor, or a controller on an external card. The system can include means for monitoring a system voltage, means for providing an alert signal if the system voltage drops below a threshold value, means for lowering peak power consumption of the means for controlling in response to the alert signal and/or means for lowering peak power consumption of one or more of the system components in response to the alert signal. The plurality of system components can include one or more of a display, a camera, an audio device, storage, memory, a modem, a communications device, an LTE communications device, a WiFi modem, a WiGig modem, a 2G communications device, a 3G communications device, or a 4G communications device.

Example 5

In some examples, a peak power method includes dynamically receiving a peak power requirement of one or more of a plurality of system components and dynamically providing, based on a system peak power limit and based on at least one updated peak power requirement received from at least one of the one or more system components, an updated component peak power limit to one or more of the system components. The method can include monitoring a system voltage and providing an alert signal if the system voltage drops below a threshold value. The method can include lowering peak power consumption of one or more of the system components in response to the alert signal. The method can include updating the threshold value. The method can include dynamically providing an updated controller peak power limit to a controller based on the system peak power limit and based on the at least one updated peak power requirement received from the at least one of the one or more system components. The controller can be one or more of a processor, an SoC, a graphics processor, or a controller on an external card. The method can include monitoring a system voltage, providing an alert signal if the system voltage drops below a threshold value, and lowering peak power consumption of the controller in response to the alert signal, and/or lowering peak power consumption of one or more of the system components in response to the alert signal. The system components can include one or more of a display, a camera, an audio device, storage, memory, a modem, a communications device, an LTE communications device, a WiFi modem, a WiGig modem, a 2G communications device, a 3G communications device, or a 4G communications device. An apparatus can include means to perform any method described herein. Machine-readable storage can include machine-readable instructions, when executed to implement any method or realize any apparatus as described herein.

Example 6

In some Examples, system components or controllers can provide maximum peak power (or PMax requirements). In some Examples, for some or all system components or controllers, the component or controller can request state transitions with or without requesting their peak power requirement. For example, in some Examples, one or more (or all) components can request state transitions only (for example, in a case of an audio device, the audio device can request a speaker on state or a speaker off state). In some Examples, the peak power requirement can come from the device itself (for example, from a register in an audio device or other device). In some Examples, a peak power requirement for a device can be computed by a power manager (for example, in response to a state transition signal from the system component). In some Examples, the power manager or a system component can delay a transition of the system component from one state to another until peak power allocation has been adjusted. In some Examples, a controller another system component can lower their peak power to a specific level after receiving an alert signal such as the a protection alert signal (for example, an under-voltage protection signal).

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A peak power system comprising:
a plurality of system components, one or more of the system components to dynamically provide a peak power requirement of the component; and
a peak power manager to:
receive the peak power requirement of the one or more system components;
dynamically provide, based on a system peak power limit and based on at least one updated peak power requirement received from at least one of the one or more system components, an updated component peak power limit to one or more of the system components;
receive from a first of the system components a request for a change in peak power for the first system component; and
in response to the request received from the first system component, adjust a peak power for the first system component and adjust a peak power for at least one other of the system components.

2. The system of claim 1, comprising under-voltage protection to monitor a system voltage and to provide an alert signal if the system voltage drops below a threshold value.

3. The system of claim 2, wherein one or more of the system components is to lower peak power consumption of that component in response to the alert signal.

4. The system of claim 2, the power manager to provide the threshold value to the under-voltage protection.

5. The system of claim 1, comprising a controller, wherein the peak power manager is to dynamically provide an updated controller peak power limit to the controller based on the system peak power limit and based on the at least one updated peak power requirement received from the at least one of the one or more system components.

6. The system of claim 5, wherein the controller is one or more of a processor, an SoC, a graphics processor, or a controller on an external card.

7. The system of claim 5, comprising under-voltage protection to monitor a system voltage and to provide an alert signal if the system voltage drops below a threshold value, the controller to lower controller peak power consumption in response to the alert signal and/or one or more of the system components to lower peak power consumption of that component in response to the alert signal.

8. The system of claim 1, wherein the plurality of system components include one or more of a display, a camera, an audio device, storage, memory, a modem, a communications device, an LTE communications device, a WiFi modem, a WiGig modem, a 2G communications device, a 3G communications device, or a 4G communications device.

9. The system of claim 1, the one or more of the system components to compute a peak power requirement of the component and to provide it to the peak power manager.

10. The system of claim 1, the peak power manager to allocate an overall system power budget based on peak power requirement information received from each of the one or more system components.

11. A peak power method comprising:
dynamically receiving a peak power requirement of one or more of a plurality of system components; and
dynamically providing, based on a system peak power limit and based on at least one updated peak power requirement received from at least one of the one or more system components, an updated component peak power limit to one or more of the system components;
receiving from a first of the system components a request for a change in peak power for the first system component; and
in response to the request received from the first system component, adjust a peak power for the first system component and adjust a peak power for at least one other of the system components.

12. The method of claim 11, comprising:
monitoring a system voltage; and
providing an alert signal if the system voltage drops below a threshold value.

13. The method of claim 12, comprising lowering peak power consumption of one or more of the system components in response to the alert signal.

14. The method of claim 12, comprising updating the threshold value.

15. The method of claim 11, comprising dynamically providing an updated controller peak power limit to a controller based on the system peak power limit and based on the at least one updated peak power requirement received from the at least one of the one or more system components.

16. The method of claim 15, wherein the controller is one or more of a processor, an SoC, a graphics processor, or a controller on an external card.

17. The method of claim 15, comprising:
monitoring a system voltage;
providing an alert signal if the system voltage drops below a threshold value; and
lowering peak power consumption of the controller in response to the alert signal, and/or lowering peak power consumption of one or more of the system components in response to the alert signal.

18. The method of claim 11, wherein the plurality of system components include one or more of a display, a camera, an audio device, storage, memory, a modem, a communications device, an LTE communications device, a WiFi modem, a WiGig modem, a 2G communications device, a 3G communications device, or a 4G communications device.

19. The method of claim 11, comprising computing at each of the one or more of the plurality of system components, a peak power requirement of the system component.

20. The method of claim 11, comprising allocating an overall system power budget based on peak power requirement information received from each of the one or more system components.

21. One or more tangible, non-transitory machine readable media comprising a plurality of instructions that, in response to being executed on at least one processor, cause the at least one processor to:
dynamically receive a peak power requirement of one or more of a plurality of system components;
dynamically provide, based on a system peak power limit and based on at least one updated peak power requirement received from at least one of the one or more system components, an updated component peak power limit to one or more of the system components;
receive from a first of the system components a request for a change in peak power for the first system component; and
in response to the request received from the first system component, adjust a peak power for the first system component and adjust a peak power for at least one other of the system components.

22. The one or more tangible, non-transitory machine readable media of claim 21, comprising a plurality of instructions that, in response to being executed on at least one processor, cause the at least one processor to:
monitor a system voltage; and
provide an alert signal if the system voltage drops below a threshold value.

23. The or more tangible, non-transitory machine readable media of claim 22, comprising a plurality of instructions that, in response to being executed on at least one processor, cause the at least one processor to:
lower peak power consumption of one or more of the system components in response to the alert signal.

24. The or more tangible, non-transitory machine readable media of claim 22, comprising a plurality of instructions that, in response to being executed on at least one processor, cause the at least one processor to:
update the threshold value.

25. The or more tangible, non-transitory machine readable media of claim 21, comprising a plurality of instructions that, in response to being executed on at least one processor, cause the at least one processor to:
dynamically provide an updated controller peak power limit to a controller based on the system peak power limit and based on the at least one updated peak power requirement received from the at least one of the one or more system components.

26. The or more tangible, non-transitory machine readable media of claim 25, wherein the controller is one or more of a processor, an SoC, a graphics processor, or a controller on an external card.

27. The or more tangible, non-transitory machine readable media of claim 25, comprising a plurality of instructions that, in response to being executed on at least one processor, cause the at least one processor to:
monitor a system voltage;
provide an alert signal if the system voltage drops below a threshold value; and
lower peak power consumption of the controller in response to the alert signal, and/or lower peak power consumption of one or more of the system components in response to the alert signal.

28. The or more tangible, non-transitory machine readable media of claim 21, wherein the plurality of system components include one or more of a display, a camera, an audio device, storage, memory, a modem, a communications device, an LTE communications device, a WiFi modem, a WiGig modem, a 2G communications device, a 3G communications device, or a 4G communications device.

29. The one or more tangible, non-transitory machine readable media of claim 21, comprising a plurality of instructions that, in response to being executed on at least one processor, cause the at least one processor to:
  compute at each of the one or more of the plurality of system components, a peak power requirement of the system component.

30. The one or more tangible, non-transitory machine readable media of claim 21, comprising a plurality of instructions that, in response to being executed on at least one processor, cause the at least one processor to:
  allocate an overall system power budget based on peak power requirement information received from each of the one or more system components.

* * * * *